United States Patent [19]
Miyamoto et al.

[11] 3,970,501
[45] July 20, 1976

[54] PROCESS FOR SEPARATING A NUMBER OF SHEETS INTO GROUPS
[75] Inventors: Akio Miyamoto; Keiso Saeki, both of Fujimiya, Japan
[73] Assignee: Fuji Photo Film Co., Ltd., Minami-ashigara, Japan
[22] Filed: Dec. 11, 1974
[21] Appl. No.: 531,503

[30] Foreign Application Priority Data
Dec. 11, 1973    Japan.............................. 48-139419

[52] U.S. Cl................................ 156/305; 156/328; 282/DIG. 2; 282/22 R; 282/24 R; 428/194; 260/67 A
[51] Int. Cl.² ........................................... B41L 1/24
[58] Field of Search ..................... 260/67 A, 505 C; 282/DIG. 2, 24, 22, 26; 156/305, 290, 291, 297; 428/194; 427/285

[56] References Cited
UNITED STATES PATENTS

| | | | |
|---|---|---|---|
| 3,216,926 | 11/1965 | Kurtz et al. ....................... | 260/67 A |
| 3,393,925 | 7/1968 | Calvert ........................... | 428/194 X |

FOREIGN PATENTS OR APPLICATIONS

| | | |
|---|---|---|
| 2,254,483 | 6/1973 | Germany |

Primary Examiner—Ralph S. Kendall
Attorney, Agent, or Firm—Sughrue, Rothwell, Mion, Zinn & Macpeak

[57]    ABSTRACT

A process for separating a number of sheets into groups of sheets comprising coating an adhesive composition on an edge of a stack of the sheets fanning the sheets. The adhesive composition contains a naphthalene sulfonic acid-formaldehyde condensation product and a water-soluble polymer material.

11 Claims, No Drawings

PROCESS FOR SEPARATING A NUMBER OF SHEETS INTO GROUPS

BACKGROUND OF THE INVENTION

1. Field of the Invention

The present invention relates to a process for separating a number of sheets into groups, and an adhesive composition of use therein.

2. Description of the Prior Art

Processes for separating a number of sheets such as a pressure sensitive copying paper are into groups are described in U.S. Pat. Nos. 2,711,375; 2,712,507; 2,730,456; 2,730,457; 3,418,250; 3,432,327; etc., for example, and adhesive compositions for use therein are described in detail in Japanese Patent Publication No. 35696/1971, Japanese Patent Publication Nos. 40464/1973 and 7634/1975, etc.

In the prior art methods, gelatin, gelatin derivatives, gelatin decomposition products, or mixtures thereof with aqueous emulsion of a resin, i.e., a polymer latex, are used as an adhesive component.

However, since gelatins tend to degrade, and the viscosity thereof varies greatly depending upon the temperature, adhesives containing gelatins are not satisfactory in storage stability, adhesiveness, and separability. In the present specification, the term "separability" designates that the sheets are separated into groups. Thus, when the separability is good, the sheets are easily separated into groups, and when the separability is poor, the sheets are difficult to separate into groups. The latexes which are added for the purpose of improving the adhesiveness decrease the separability, and thus it is desired that the adhesives containing the latexes are further improved.

SUMMARY OF THE INVENTION

An object of the present invention is to provide a process for separating simply and correctly a number of sheets into groups.

Another object of the present invention is to provide an adhesive composition which has excellent storage stability, adhesiveness, separability, and drying rate, and which is used in separating a number of sheets into groups.

These and other objects and advantages of the present invention will be apparent from the following description.

The objects of the invention are attained by using an adhesive composition containing a naphthalene sulfonic acid-formaldehyde condensation product and a water-soluble polymer material.

DETAILED DESCRIPTION OF THE INVENTION

By the process for separating sheets into groups of the present invention is meant that when the cut edge of a stack of a number of sheets, i.e., an edge of a stack of sheets, is coated with an adhesive and fanned or stroked, the sheets of each group are selectively adhered. The process will be explained by reference to the case where the sheets are pressure sensitive copying papers. In this case, the pressure sensitive copying papers are the combination of a sheet produced by coating a microcapsule layer containing a color former on a support (hereinafter referred to as an "A Sheet"), a sheet produced by coating a developing agent layer and the foregoing microcapsule layer on the surface and the back of a support, respectively (hereinafter referred to as a "B Sheet"), and a sheet produced by coating a developing agent layer on a support (hereinafter referred to as a "C Sheet"), or the combination of an A Sheet and a C Sheet.

These pressure sensitive copying papers are assembled in the sequence of, for example, A-C, A-C, A-C, . . . , or A-B-B . . . -B-C, A-B-B . . . -B-C, A-B-B . . . -B-C, . . . , and they are cut to thereby produce, for example, a sheaf of slips. When an adhesive composition is coated on the cutting plane, or the edge of the stack, and dried, each A-C or A-B-B . . . -B-C set is selectively adhered and no adhesion occurs between C and A. The adhesion strength of A-C or A-B-B . . . -B-C must be at least sufficient such that these sheets are not peeled apart with simple handling. It is most preferred that no adhesion between C and A occurs at all, i.e., a good separability. Thus, by applying an adhesive composition to pressure sensitive copying papers, the pressure sensitive copying papers are easily separated into groups comprising a certain number of papers which are required for copying.

The naphthalene sulfonic acid-formaldehyde condensation products of the present invention are preferably represented by the following general formula:

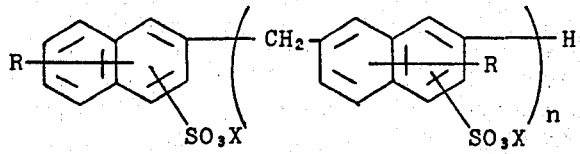

wherein R, which may be the same or different, (a plurality of R groups can be contained in the naphthalene nuclei), is a hydrogen atom or an alkyl group; X is a hydrogen atom, an alkali metal atom, or an ammonium group, and $n$ is an integer.

Those condensation products in which the alkyl group contains 1 to 18 carbon atoms, X is a sodium or potassium atom, or an ammonia group, and $n$ is 1 to 13, are conveniently used and are thus preferred in the present invention. Particularly, those condensation products in which R is a hydrogen atom or an alkyl group containing 1 to 4, particularly 1 to 3 carbon atoms, X is a sodium or potassium atom, and $n$ is 1 to 5, particularly 2 to 5, are preferred. Suitable examples of alkyl groups having 1 to 18 carbon atoms are methyl, ethyl, propyl, isopropyl, n-butyl, hexyl, octyl, undecyl, hexadecyl, etc. Preferable examples of these alkyl groups are methyl, ethyl, propyl, isopropyl and n-butyl, and hydrogen is particularly preferred as R. Various compounds represented by the above general formula are known as anionic surface active agents and are readily available.

The degree of polymerization and the substituents of the napthalene sulfonic acid-formaldehyde condensation product of the present invention sometimes influence the effect of the present invention. Hence, mixtures of condensation products having different degrees of polymerization and/or different substituents are sometimes useful.

The water-soluble polymer material is a polymer material which is soluble in water and capable of forming a film when dried. A suitable molecular weight ranges from about 100 to about 500,000, preferably 300 to 100,000. Representative examples of these water-soluble polymer materials are natural polymers, e.g., gelatin, casein, albumin, shellac, starch, dextrin, agar agar, alginic acid salts, gum arabic, pectin, tragacanth gum, gluten and the like; semi-synthetic polymers, e.g., carboxymethyl cellulose, methyl cellulose, ethyl cellulose, hydroxyethyl cellulose, maleated starch, phosphoric acid starch, cyanoethyl carboxymethyl starch, hydroxyethyl starch, dialdehyde starch, oxidized starch, and the like; synthetic polymers, e.g., polyvinyl alcohol, polyacryl amide, polyvinyl pyrrolidone, polyethylene oxide, polyvinyl methyl ether, acrylic acid-acrylamide copolymers, styrene-methacrylic acid copolymers, vinyl acetate-acrylic acid copolymers, dimethyl itaconateacrylic acid copolymers, acrylonitrile-acrylic acid copolymers, acrylonitrile-acrylamide-acrylic acid copolymers, acrylamide-styrene-acrylic acid copolymers, and the like; etc.

Preferably the adhesive composition of the present invention contains about 5 to 40% by weight, particularly 7 to 30% by weight, of the naphthalene sulfonic acid-formaldehyde condensation product, and about 0.1 to 20% by weight, particularly 0.1 to 15% by weight, of the water-soluble polymer material.

The adhesive composition can contain, if desired, a water-dispersible binder. In general, the use of a binder in the adhesive composition for separating sheets into groups has been disadvantageous in that separability is lost and a long period of time is required in the adhesion although the adhesion strength is increased. To the contrary, in the present invention, the use of the binder enables a composition to be obtained which is excellent in separability and adhesiveness, and thus the application of the composition can be extended.

Suitable water-dispersible binders include generally latexes and emulsions with water as a dispersion medium, such as a styrene-butadiene based latex, a butadiene-acrylonitrile based latex, a chloroprene based latex, a vinyl acetate based latex, an acryl based latex, a vinyl chloride based latex, or a like based latex as obtained by emulsion polymerization, and a polybutadiene emulsion, a polyisoprene emulsion, a butyl rubber emulsion, and the like which are produced by dispersing polymers produced by ion polymerization in water using a solvent and an emulsifier. The polymer material latexes will be described in detail. The styrene-butadiene rubber latex comprises 25 to 75 parts by weight of styrene and 75 to 25 parts by weight of butadiene, preferably 40 to 65 parts by weight of styrene and 60 to 35 parts by weight of butadiene, and the latex can more preferably be carboxy-modified. The butadiene-acrylonitrile rubber latex comprises 75 to 60 parts by weight of butadiene and 25 to 40 parts by weight of acrylonitrile. For the vinyl acetate based latex, polyvinyl acetate, and copolymers of vinyl acetate and acrylic acid esters or methacrylic acid esters, e.g., methyl acrylate, ethyl acrylate, and methyl methacrylate, can be used, and particularly, a vinyl acetate-acrylic acid ester copolymer and a vinyl acetate-methacrylic acid ester copolymer are preferred. For the acryl based latex, a methacrylic acid ethyl ester-acrylic acid ethyl ester copolymer, a styrene-acrylic acid ester copolymer, a butadiene-acrylic acid ester copolymer, and the like can be used. Furthermore, a vinyl chloride based latex and a vinylidene chloride based latex, etc., can be used. Particularly useful polymer material latexes are a styrene-butadiene based latex and an acryl based latex, and carboxy modified latexes are particularly preferred. The polymer material emulsion which can be used in the present invention generally has a solid content of 10 to 70% by weight, a particle diameter of 0.1 to 5.0 μ, and a viscosity of 0.5 to 1000 poises.

The water-dispersible binders are used for forming a film, and it is further preferred that they have adhesiveness as an adhesive and the ability to selectively permeate an adhesive between sheets. Where the adhesive composition contains a water-dispersible binder, the adhesive composition can contain about 10 to 300% by weight, preferably 50 to 200% by weight, of the water-dispersible binder based upon the weight of the above described condensation product.

The adhesive composition of the present invention can contain, if desired, cationic, anionic, non-ionic or amphoteric surface active agents such as sodium dodecylbenzene sulfonate, trimethyloctadecyl ammonium chloride, sodium oleate, a polyoxyethylene alkylaryl ether, polyethylene glycol dedecylphenyl ether, sodium lignic sulfonate, sorbitan monooleate, an alkyl betaine, an alkyl imidazole, and the like. The surface active agent can be present in a proportion of 0.1 to 5% by weight based upon the weight of the above-described condensation product.

The microcapsules for use in pressure sensitive copying papers can be easily produced using well known methods. Since the concentration of the color former can be easily determined on dissolving the color former in the solvent employed in the production of the microcapsules, the present invention is not restricted in terms of microcapsule production method at all. Microcapsules can be produced according to, for example, the coacervation method as described in U.S. Pat. Nos. 2,800,457; 2,800,458; 3,041,289; 3,687,865; etc., the interfacial polymerization method as described in U.S. Pat. Nos. 3,492,380; 3,577,515; British Patent Nos. 950,443; 1,046,409; 1,091,141; etc., internal polymerization method as described in British Patent No. 1,237,498, French Patent Nos. 2,060,818; 2,090,862; etc., external polymerization method as described in British Patent No. 989,264, Japanese Patent Publication Nos. 12380/1962, 14327/1962, 29483/1970, 7313/1971, 30282/1971, etc., and the like.

Solvents for use in dissolving the color former in the present invention are not limited and thus any hitherto used solvent can be employed. Typical examples of suitable solvents are aromatic synthetic oils such as alkylated naphthalene, alkylated biphenyl, hydrogenated terphenyl, alkylated diphenyl methane, and the like (wherein the number of carbon atoms in the alkyl group is about 1 to 5, and the number of alkyl groups is 1 to 4), petroleum fractions such as kerosene, naphtha, paraffin, and the like, aliphatic synthetic oils such as chlorinated paraffin, and the like, vegetable oils such as cotton seed oil, soy bean oil, linseed oil, and the like, and mixtures thereof. The concentration of the color former solution is not particularly restricted, and thus microcapsules can be easily produced by one skilled in the art using a concentration of the color former solution (about 1 to 10%) as used in conventional pressure sensitive copying papers.

The color former of the present invention is a substantially colorless compound which forms a color when brought in contact with a solid acid and the color former can be defined as an electron accepting and substantially colorless organic compound. The type and characteristics of the color former do not materially influence the present invention because the composition of the adhesive is important in the present invention. Thus, any kind of color former can be used. For example, triarylmethane compounds, diarylmethane compounds, xanthene compounds, thiazine compounds, spiropyran compounds and the like can be used.

Representative examples of color formers are listed below.

Examples of triphenylmethane compounds are 3,3-bis(p-dimethylaminophenyl)-6-dimethylaminophthalide, i.e., Crystal Violet lactone, 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis-(2-phenylindol-3-yl)-5-dimethylaminophthalide, 3-p-dimethylaminophenyl-3-(1-methylpyrrol-2-yl)-6-dimethylaminophthalide, and the like.

Examples of diphenylmethane compounds are 4,4'-bisdimethylaminobenzhydrine benzyl ether, N-halophenyl leuco Auramin, N-2,4,5-trichlorophenyl leuco Auramine, and the like.

Examples of xanthene compounds are Rhodamine-B-anilinolactam, Rhodamine-(p-nitroanilino)lactam, Rhodamine-B-(p-chloroanilino)lactam, 7-dimethylamino-2-methoxyfluoran, 7-diethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran, 7-diethylamino-3-(diethylamino)fluoran, and the like.

Examples of thiazine compounds are benzoyl leuco Methylene Blue, p-nitrobenzyl leuco Methylene Blue, and the like.

Examples of spiro compounds are 3-methyl-spirodinaphthopyran, 3-ethyl-spiro-dinaphthopyran, 3,3-dichloro-spiro-dinaphthopyran, 3-benzyl-spiro-dinaphthopyran, 3-methylnaphtho-(3-methoxybenzo)-spiropyran, 3-propyl-spiro-dibenzodipyran, and the like.

These color formers can be used alone or as mixtures comprising two or more thereof.

Thus, a microcapsule coating liquid can be obtained. Preferably, the microcapsule is mono-nuclear, but the objects of the present invention can be attained with multi-nuclear capsules. The size of the microcapsules is generally about 1 to 500 $\mu$, and preferably about 2 to 50 $\mu$. In the present invention, capsules having about the same size can be used.

The microcapsule coating liquid can be coated on a support as it is since it is generally a capsule dispersion liquid. A binder such as a latex, e.g., a styrene-butadiene rubber latex, and the like, or a water-soluble polymeric compound, e.g., starch, carboxymethyl cellulose, polyvinyl alcohol, gum arabic, casein, gelatin, and the like can be added and coated, with or without a separation of the microcapsules from the capsule dispersion. Furthermore, a capsule reinforcing agent such as a fine powder of cellulose as described in U.S. Pat. No. 2,711,375, a fine powder of a polymer as described in U.S. Pat. No. 3,625,736, a fine powder of starch as described in British Patent No. 1,232,347, and microcapsules containing no color former as described in British Patent No. 1,235,991 can be added to the capsule coating liquid or a capsule layer. It is desirable that the capsule reinforcing agent is present scattered in the capsule layer or on the surface thereof rather than in a layer form.

A paper, a plastic film, a resin coated paper, a synthetic paper, and the like can be used as the support. The microcapsule layer is coated on at least one side of the support, or on or under the developer layer as described hereinafter, or on the side of the support opposite the developer layer.

In the present specification, the developer designates a solid acid, and more specifically an electron accepting solid acid. Examples of developers are described in the above-described patents, and include, for example, clays, e.g., acid clay, activated clay, attapulgite, and the like, organic acids, e.g., aromatic carboxy compounds such as salicyclic acid, aromatic hydroxy compounds such as p-t-butylphenol, p-t-amylphenol, o-chlorophenol, m-chlorophenol, p-chlorophenol, and the like, or metal salts thereof such as the zinc salt and the like, mixtures of an organic acid and a metal compound, e.g., zinc oxide, acid polymers, e.g., a phenol-formaldehyde resin, and a phenolacetylene resin, and the like. Suitable developers are described in U.S. Pat. Nos. 3,501,331; 3,669,711; 3,427,180; 3,455,721; 3,516,845; 3,634,121; 3,672,935; 3,722,120; 3,772,052, Japanese Patent Application Nos. 48545/1970, 49339/1970, 83651/1970, 84539/1970, 93245/1970, 93247/1970, 94874/1970, 109872/1970, 112038/1970, 112040/1970, 118978/1970, 118979/1970, 86950/1971, etc.

The developer can be coated on the support together with a binder. Suitable supports are described above. Latexes such as a styrene-butadiene rubber latex, a styrene-butadiene-acrylonitrile latex, a sytrene-maleic acid copolymer latex, and the like; water-soluble natural polymeric compounds such as proteins, e.g., gelatin, gum arabic, albumin, casein, etc., celluloses, e.g., carboxymethyl cellulose, hydroxyethyl cellulose, etc., saccharides, e.g., agar, sodium alignate, starch, carboxymethyl starch, etc., and the like; water-soluble synthetic polymeric compounds such as polyvinyl alcohol, polyvinyl pyrrolidone, polyacrylic acid, polyacrylamide, and the like; organic solvent-soluble polymeric compounds such as nitrocellulose, ethylcellulose, a polyester resin, polyvinyl acetate, polyvinylidine chloride, a vinyl chloride-vinylidene chloride copolymer, and the like; etc., can be used as the binder. These binders can also be used as a binder for the capsule dispersion liquid. In addition, hitherto known additives can be added to the developer layer.

The naphthalene sulfonic acid-formaldehyde condensation product can be considered to be a quite excellent component in that it provides an adhesive with separability. However, the naphthalene sulfonic acid-formaldehyde condensation product alone provides only low adhesive strength.

On the other hand, the water-soluble polymer material provides high adhesive strength, but has insufficient separability. Thus, by mixing the naphthalene sulfonic acid-formaldehyde condensation product and the water-soluble polymer material, an adhesive composition can be obtained which is quite excellent in adhesion strength and separability as compared with a gelatin or derivative thereof-latex system, the naphthalene sulfonic acid-formaldehyde condensation product alone, or the water-soluble polymer material alone. That is, the adhesive composition of the present invention is far superior to conventional adhesives, and the range of its use can be increased.

The present invention will be explained by reference to the following examples. A, B, and C Sheets as used in the examples were prepared as follows. Unless otherwise stated, all parts, percentages, ratios and the like are by weight.

PREPARATION OF A SHEET

In 40 parts of water at 40°C, 6 parts of an acid treated gelatin having an isoelectric point of 8.2 and 4 parts of gum arabic were dissolved. To the resulting solution, 0.2 parts of Turkey red oil was added to prepare a colloidal solution. To the colloidal solution was added with vigorous stirring 45 parts of diisopropyl naphthalene oil (a color former oil) in which 30% by weight of Crystal Violet lactone and 2.5% by weight of benzoyl leuco Methylene Blue were dissolved, to prepare an O/W emulsion. When the size of the oil droplets became 8 to 12μ, the stirring was stopped. To the emulsion was added 185 parts of hot water at 40°C. With stirring, a 20% hydrochloric acid aqueous solution was added dropwise to adjust the pH to 4.4. The emulsion was cooled externally with stirring to thereby gel the colloidal wall accumulated on the oil droplet. When the liquid temperature reached 10°C, 1.5 parts of a 37% formaldehyde aqueous solution was added while continuing the stirring. Then, 20 parts of a 7% by weight solution of carboxymethyl cellulose sodium salt having a degree of etherification of 0.75 was added. A 10% by weight sodium hydroxide solution was added dropwise to adjust the pH of the system to 10, and the system was heated externally and kept at 40°C for 1 hour. Thus, a color former containing capsule solution A was obtained. To the resulting capsule solution, 5 parts of cellulose powder, 3 parts of wheat starch powder passed through a sieve of 15 to 25 μ, and 80 parts of a 10% oxidized starch solution were added to thereby prepare a capsule solution. The capsule solution was coated on a paper of 40 g/m² using air knife coating in a coating amount (solid content) of 5.5 g/m² and thus A Sheet was obtained.

PREPARATION OF B SHEET

To 150 parts of water was added 6 parts of a 20% sodium hydroxide aqueous solution. With stirring, 50 parts of activated clay was gradually added. After stirring for 30 minutes, 20 parts of a styrene-butadiene latex (concentration: 48% by weight; pH: 8.5; viscosity: 250 c.p.; average particle size: 0.16 μ) was added and the composition was mixed uniformly. The resulting coating liquid was coated on a paper of 40 g/m² in an amount of 8 g/m² (solid content), which was, after drying, subjected to calendering. Then, on the opposite side of the support, the same capsule coating liquid as used in preparing the A sheet was coated in an amount of 6 g/m² (solid content) and dried.

PREPARATION OF C SHEET

The same developer (activated clay) coating liquid as used in preparing B Sheet was coated on a paper of 110 g/m² in an amount of 8 g/m² (solid content) and after drying, subjected to calendering.

TEST PROCEDURE 50 sets of A, B, and C Sheet in the order of A-B-B-C were stacked and cut to a size of 3 cm × 5 cm. To the cut edge of the stack, an adhesive was coated in an amount of 5 g/100 cm² and dried at room temperature (about 20°~ 30°C). One hour after the drying, the adhesiveness and the separability were measured using the following methods.

MEASUREMENT OF ADHESIVENESS

The adhesion strength (in g) was measured using a tensile strength tester (trade name: Strograph M type, produced by Toyo Seiki Seisakujo). The measuring conditions were as follows:

| Load Capacity | 1 kg |
| Tension Speed | 150 mm/minute |
| Load Detector | U gauge type load converter |
| Recorder | Feed speed 200 mm/minute |

MEASUREMENT OF SEPARABILITY

| | |
|---|---|
| No adhesion between C and A Sheets | 100 |
| Slightly adhered, but easily peeled apart | 80 |
| Adhered and peeled apart with difficulty | 60 |
| Completely adhered and not peeled apart at all (separation is impossible) | 0 |

EXAMPLE 1

The sodium salt of the naphthalene sulfonic acid-formaldehyde condensation product represented by the formula:

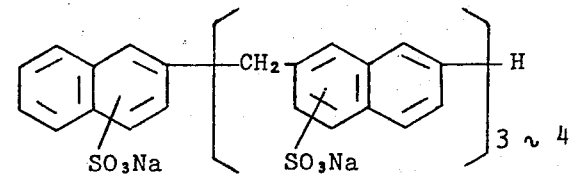

was dissolved in hot water at 50°C. To the resulting solution was added polyvinyl alcohol (degree of polymerization: 500; degree of saponification: 88%) to produce an adhesive composition. The ratio of the condensation product to the polyvinyl alcohol and the solid concentrations thereof in the composition were varied as indicated in Table 1, and the adhesive strength and separability between A-B, B-B, and B-C were measured. The results obtained are shown in Table 1.

TABLE 1

| Solid Concentration | Properties | Parts by Weight of Polyvinyl Alcohol per 3 Parts by Weight of Condensation Product | | | |
|---|---|---|---|---|---|
| | | 0.05 | 0.1 | 0.5 | 1.0 |
| 10%: | | | | | |
| | Adhesion Strength (g) | | | | |
| | A-B | 90 | 118 | 290 | 280 |
| | B-B | 105 | 195 | 387 | 380 |
| | B-C | 115 | 280 | 500 | 450 |
| | Separability | 100 | 100 | 100 | 90 |
| 15%: | | | | | |
| | Adhesion Strength (g) | | | | |
| | A-B | 105 | 320 | 350 | 360 |
| | B-B | 220 | 350 | 410 | 480 |
| | B-C | 240 | 470 | 430 | 495 |
| | Separability | 100 | 100 | 100 | 80 |
| 20%: | | | | | |
| | Adhesion Strength (g) | | | | |
| | A-B | 95 | 320 | 350 | 300 |
| | B-B | 100 | 450 | 480 | 480 |
| | B-C | 87 | 470 | 380 | 290 |

TABLE 1-continued

| Solid Concentration | Properties | Parts by Weight of Polyvinyl Alcohol per 3 Parts by Weight of Condensation Product | | | |
|---|---|---|---|---|---|
| | | 0.05 | 0.1 | 0.5 | 1.0 |
| | Separability | 100 | 100 | 80 | 70 |

| | |
|---|---|
| Load Capacity | 1 kg |
| Tension Speed | 150 mm/minute |
| Load Detector | U gauge type load converter |
| Recorder | Feed speed 200 mm/minute |

COMPARISON EXAMPLE 1

The same sodium salt of naphthalene sulfonic acid-formaldehyde condensation product as used in Example 1 was dissolved in hot water in the concentrations as indicated in Table 2 to prepare adhesive compositions. The results obtained for adhesion strength and separability are shown in Table 2.

TABLE 2

| | Concentration of Condensation Product (%) | | | |
|---|---|---|---|---|
| | 8 | 12 | 16 | 20 |
| Adhesion Strength (g) | | | | |
| A-B | 2 | 5 | 10 | 21 |
| B-B | 3 | 5 | 10 | 22 |
| B-C | 2 | 5 | 9 | 19 |
| Separability | 100 | 100 | 100 | 100 |

COMPARISON EXAMPLE 2

To the same water-soluble polymer material (polyvinyl alcohol) as used in Example 1 was added water in the amounts as indicated in Table 3 to prepare adhesive compositions. The properties measured are shown in Table 3.

TABLE 3

| | Concentration of Polyvinyl Alcohol (%) | | | |
|---|---|---|---|---|
| | 2 | 6 | 10 | 14 |
| Adhesion Strength (g) | | | | |
| A-B | 89 | 182 | 250 | 275 |
| B-B | 75 | 205 | 300 | 315 |
| B-C | 70 | 215 | 317 | 330 |
| Separability | 50 | 0 | 0 | 0 |

As is apparent from the results in Tables 1 to 3, with the naphthalene sulfonic acid-formaldehyde condensation product alone, the separability was good, but the adhesion strength was low, and with the polyvinyl alcohol alone, the separability was quite poor, whereas with the adhesive composition of the present invention, the adhesion strength and separability were both increased. The degree of the improvement apparently indicates a synergistic effect with the components.

EXAMPLE 2

26 parts of the sodium salt of naphthalene sulfonic acid-formaldehyde condensation product represented by the formula:

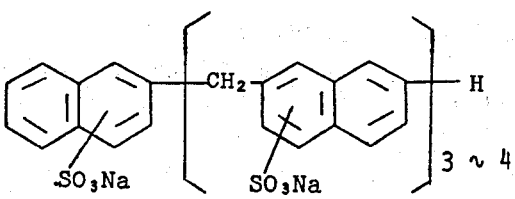

3 parts of shellac, and 0.5 parts of monoethanolamine were dissolved in 71.5 parts of hot water at 50°C to prepare an adhesive composition.

EXAMPLE 3

15 parts of the sodium salt of naphthalene sulfonic acid-formaldehyde condensation product represented by the formula:

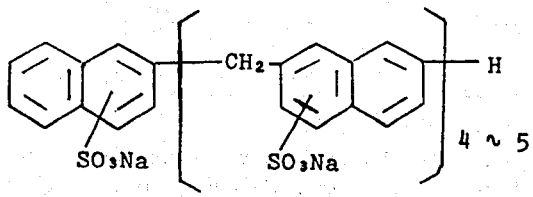

and 2 parts of Selogen 7A (trade name for the sodium salt of carboxymethyl cellulose produced by Daiichi Seiyaku Co., Ltd.) were dissolved in 82 parts of hot water at 50°C to prepare an adhesive composition.

EXAMPLE 4

After 10 parts of the sodium salt of naphthalene sulfonic acid-formaldehyde condensation product represented by the formula:

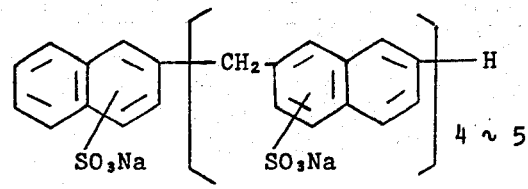

was dissolved in 80 parts of hot water at 50°C, 5 parts of Nipol LX 407 (trade name for a modified styrene-butadiene copolymer latex produced by Nippon Zeon Co., Ltd.; solid content: 49%) and 2 parts of hydroxyethyl cellulose were added and mixed to prepare an adhesive composition.

EXAMPLE 5

15 parts of the sodium salt of the methylnaphthalene sulfonic acid-formaldehyde condensation product represented by the formula:

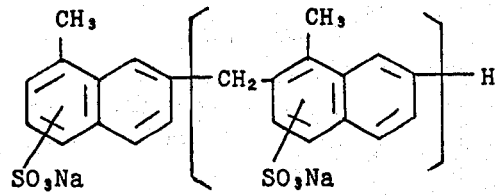

and 3 parts of polyvinyl alcohol (degree of saponification: 88%; average degree of polymerization: 500) were dissolved in 90 parts of hot water at 60°C to prepare an adhesive composition.

EXAMPLE 6

15 parts of the potassium salt of naphthalene sulfonic acid-formaldehyde condensation product represented by the formula:

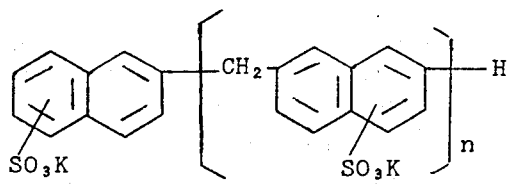

| n | proportion |
|---|---|
| 3 or less | 15% |
| 4 to 6 | 50% |
| 6 to 12 | 35% | and 0.5 parts of dimethyldodecyl ammonium chloride were dissolved in 85 parts of hot water at 50°C, and then 8 parts of Primal HA-16 (trade name for a modified methyl methacrylate-ethyl acrylate copolymer latex produced by Nippon Acryl Co., Ltd.; solid content: 45%; pH: 3.0) and 2 parts of gum arabic were added to prepare an adhesive composition.

The properties of the adhesive compositions prepared in Examples 2 to 6 are shown in Table 4.

TABLE 4

| Example | Adhesion Strength (g) A-B | B-B | B-C | Separability |
|---|---|---|---|---|
| 2 | 105 | 250 | 300 | 100 |
| 3 | 115 | 230 | 285 | 100 |
| 4 | 141 | 290 | 372 | 100 |
| 5 | 95 | 192 | 250 | 100 |
| 6 | 132 | 271 | 260 | 100 |

It can be understood from the results in Table 4 that the composition containing the naphthalene sulfonic acid-formaldehyde condensation product and the water-soluble polymer material is quite excellent as an adhesive for separating sheets into groups.

COMPARISON EXAMPLES 3 To 5

The water-soluble polymer materials as indicated in Table 5 below were alone dissolved in water to prepare adhesive compositions.

The adhesive compositions were tested according to the above-described methods and the results obtained are shown in Table 5.

TABLE 5

| | Comparison Example 3 | Comparison Example 4 | Comparison Example 5 |
|---|---|---|---|
| | Selogen 7A 5% | Hydroxyethyl Cellulose 8% | Gum Arabic 30% |
| Adhesion Strength (g) | | | |
| A-B | 105 | 45 | 50 |
| B-B | 90 | 60 | 55 |
| B-C | 88 | 55 | 70 |
| Separability | 0 | 0 | 10 |

As is apparent from the results in Tables 3 and 5, with the water-soluble polymer materials alone the adhesion strength is quite high, but the separability is poor, and thus they can not be used as an adhesive for separating a number of sheets into groups.

As shown by the results in Table 2, with the naphthalene sulfonic acid-formaldehyde condensation product alone, the separability is good, but the adhesion strength is disadvantageously very low.

To the contrary, the mixture of the naphthalene sulfonic acid-formaldehyde condensation product and the water-soluble polymer material can be seen to be quite useful as an adhesive composition for separating a number of sheets into groups.

While the invention has been described in detail and with reference to specific embodiments thereof, it will be apparent to one skilled in the art that various changes and modifications can be made therein without departing from the spirit and scope thereof.

What is claimed is:

1. A process for separating a number of pressure sensitive copying papers into groups which comprises (1) coating an adhesive composition comprising a naphthalene sulfonic acid-formaldehyde condensation product and a water-soluble polymer on an edge of a stack assembly of said copying papers and then (2) fanning said copying papers; said naphthalene sulfonic acid-formaldehyde condensation product comprising about 5 to 40% by weight of the adhesive composition and said water-soluble polymer, which is selected from the group consisting of natural polymer, a semi-synthetic polymer and a synthetic polymer, comprising about 0.1 to 20% by weight of the adhesive composition.

2. The process according to claim 1, wherein the naphthalene sulfonic acid-formaldehyde condensation product is represented by the formula:

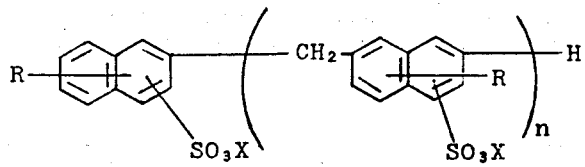

wherein R, which may be the same or different and a plurality of which may be present on the naphthalene nuclei, is a hydrogen atom or an alkyl group; X is a hydrogen atom, an alkali metal atom, or an ammonium group; and n is an integer.

3. The process according to claim 2, wherein R is an alkyl group containing 1 to 4 carbon atoms.

4. The process according to claim 2, wherein X is a sodium atom.

5. The process according to claim 2, wherein X is a potassium atom.

6. The process according to claim 2, wherein n is an integer of from 1 to 5.

7. The adhesive composition according to claim 1, wherein the water-soluble polymer material is selected from the group consisting of a natural polymer, a semi-synthetic polymer, and a synthetic polymer.

8. The process according to claim 1, wherein the natural polymer is selected from the group consisting of gelatin, casein, agar agar, albumin, shellac, starch, dextin, an alginic acid salt, gum arabic, pectin, tragacanth gum and gluten.

9. The process according to claim 1, wherein the semi-synthetic polymer is selected from the group consisting of carboxymethyl cellulose, phosphoric acid starch, maleated starch, cyanoethyl carboxymethyl starch, hydroxyethyl starch, dialdehyde starch, and oxidized starch.

10. The process according to claim 1, wherein the synthetic polymer is selected from the group consisting of polyvinyl alcohol, polyacrylamide, polyvinyl pyrrolidone, polyethylene oxide, polyvinyl methyl ether, an acrylic acid-acrylamide copolymer, a styrene-methacrylic acid copolymer, a vinyl acetate-acrylic acid copolymer, a dimethyl itaconate-acrylic acid copolymer, an acrylonitrile-acrylic acid copolymer, and an acrylamide-styrene-acrylic acid copolymer.

11. The process according to claim 1, wherein said adhesive composition includes a surface active agent in a proportion of 0.1 to 5% by weight based upon the weight of the naphthalene sulfonic acid-formaldehyde condensation product.

* * * * *